Sept. 8, 1942.　　　　E. J. DILLMAN　　　　2,295,455
CONTROL SYSTEM
Original Filed Aug. 5, 1937
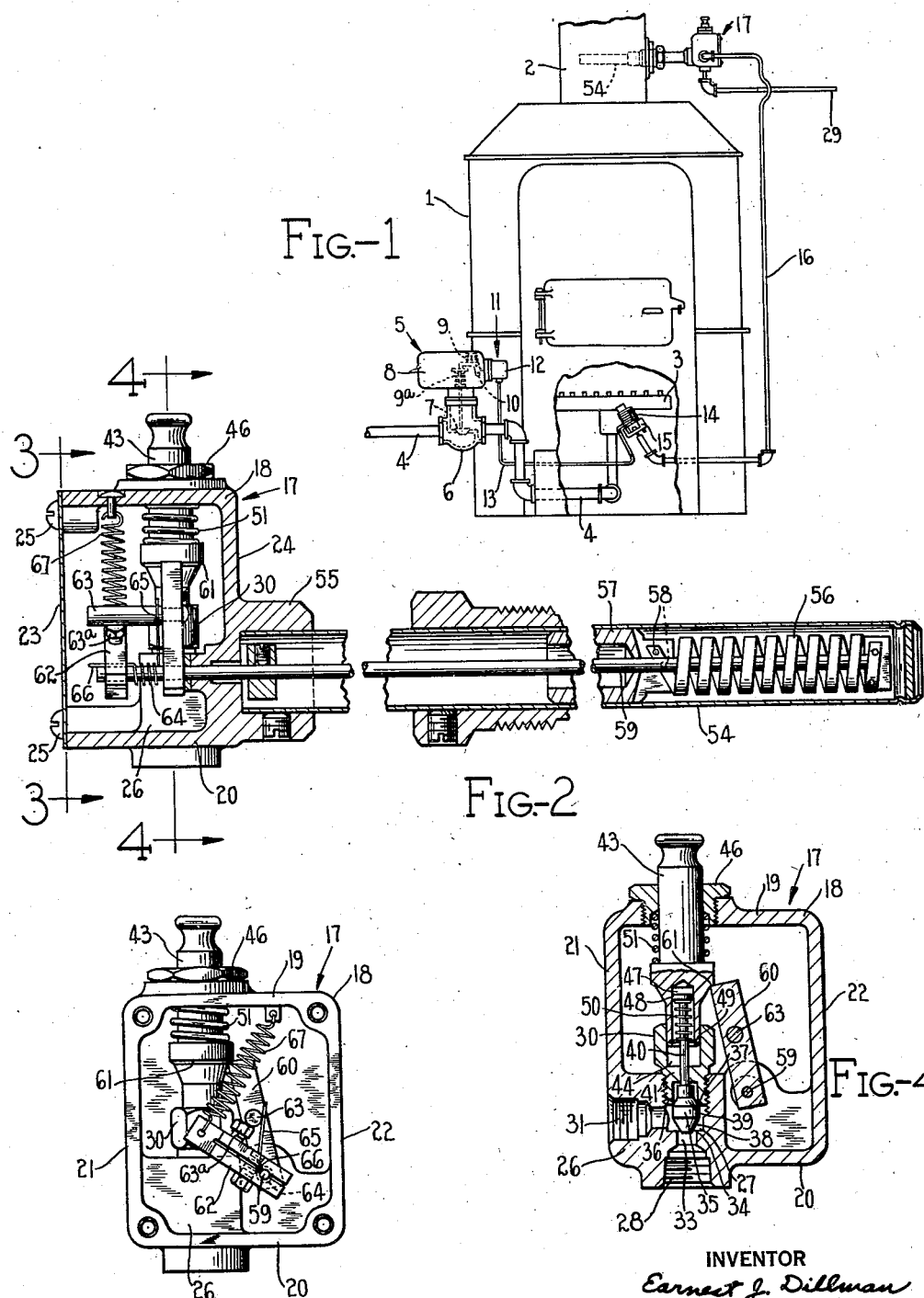
INVENTOR
Earnest J. Dillman
BY
Andrew K. Fulda
his ATTORNEY Patented Sept. 8, 1942

2,295,455

UNITED STATES PATENT OFFICE 2,295,455

CONTROL SYSTEM

Earnest J. Dillman, Detroit, Mich., assignor to Detroit Lubricator Company, Detroit, Mich., a corporation of Michigan Original application August 5, 1937, Serial No. 157,584. Divided and this application November 8, 1939, Serial No. 303,362

6 Claims. (Cl. 126—351)

My invention relates generally to heating apparatus and more particularly to a system and a control device for use in the system for controlling the apparatus.

One of the objects of my invention is to provide a new and improved control system for controlling the heat supplied to the heat transference medium of a heating apparatus.

Another object is to provide novel means for controlling the delivery of fluid fuel to a burner.

Another object is to provide a heating apparatus control system for controlling burner operation when the temperature of the products of combustion reaches a predetermined high temperature, so as to prevent the heating apparatus from reaching a dangerously high temperature.

Another object is to provide a liquid heating apparatus with means to decrease the heating of the liquid upon the occurrence of low liquid level.

Another object is to provide a new and improved thermostatic valve which, among other uses, is particularly adapted for automatically stopping flow of fuel to a burner at a predetermined temperature.

The invention consists in the improved system and the construction and combination of parts comprising the same, all as will be more fully described hereinafter and the novelty of which will be particularly pointed out and distinctly claimed.

In the accompanying drawing, to be taken as a part of this specification, I have fully and clearly illustrated my invention, in which drawing—

Figure 1 is a view of a heating apparatus having my control system;

Fig. 2 is a view in central cross-section of an improved thermostatic control device of my system;

Fig. 3 is an end view of the control device of Fig. 2 taken along the line and in the direction of the arrows 3—3 of Fig. 2, and Fig. 4 is a view shown in cross-section of the device of Fig. 2 and taken along the line and in the direction of the arrows 4—4 of Fig. 2.

Referring to the drawing by characters of reference the numeral 1 designates in general a heating apparatus which, in the broader aspect of my invention, may be either a liquid heating means or a furnace having an outlet flue or stack 2 for the products of combustion, and having a fluid fuel burner 3 connected to a source of supply of fuel by a supply line or pipe 4. In the fuel supply line 4 there is a control device, designated in general by the numeral 5, to control delivery of fuel to the burner 3, this control device being shown and described in detail in my copending application, Serial No. 83,232, filed June 3, 1936. The control device 5 includes a valve body 6 having a fuel flow passage therethrough including a port that is controlled by a valve member 7. Mounted on the top of the valve body 6 there is a casing 8 into which the stem of valve 7 projects, and the valve is biased toward closed position by a spring 9 that is disposed in the casing 8. A second spring 9ª is provided and is adapted to move the valve 7 upward to open position, but the force exerted by the spring 9ª to open the valve is less than the force exerted by the spring 9 to close the valve. Also, in the casing 8 there is a lever 10 through which a thermostatic power element 11 acts to overcome the spring 9 to permit the spring 9ª to move and hold the valve 7 in an open position. The thermostatic power element 11 includes an expansible or variable capacity chamber that may be formed by a casing 12 and a metallic bellows (not shown) within the casing 12 which may be externally mounted on and secured to the other casing 8 by screws, or by other suitable means. The expansible chamber is connected by a tube or conduit 13 to a bulb element 14 that is arranged to be heated by a control burner 15 which may also serve as a pilot light for lighting the main burner 3. The bellows has a movable end wall that is operatively connected to the lever 10, and the expansible chamber, conduit 13 and bulb 14 provide a closed system that is charged with a suitable temperature responsive, expansible-contractible fluid, such as aniline. So long as the pilot or control burner 15 remains lighted, the expansion of the thermostatic fluid will be such that it will hold the valve 7 open against the action of the spring 9, but when the pilot light is extinguished, the thermostatic fluid will cool, with accompanying contraction, which will permit the spring 9 to seat the valve 7 and thus stop flow of fuel to the main burner 3.

Fuel is delivered to the control burner 15 through a conduit or pipe 16, and a temperature responsive control device 17 is provided to stop delivery of fuel to the control burner 15 when the temperature of the furnace 1 reaches a predetermined high temperature. The control device 17 includes a hollow casing 18 having a top wall 19, bottom wall 20, side walls 21, 22, a front wall 23, and a rear wall 24. The front wall 23 is preferably formed by a removable closure member or plate-like cover that may be held in place by screws 25, or by other suitable means. The casing bottom wall 20 preferably has an upwardly directed, offset wall portion 26 within the casing, and the offset wall portion 26 preferably joins with the casing rear and side walls 24 and 21 respectively. The offset wall portion 26 has therein a valve chamber 27 that may be formed by a vertically extending, bored recess, and leading into the valve chamber 27 through the casing bottom wall 20 there is an inlet passage or bore 28 that may be connected to a source of supply of fluid fuel by a conduit or pipe 29, Fig. 1. The bored recess or chamber 27 preferably opens through the top of wall 26 and is closed by a tubular shaped closure member or fitting 30 that may have an end portion thereof screw-threaded into the bored recess or chamber 27. Leading out of the valve chamber 27, preferably through the casing side wall 21, there is an outlet passage or bore 31 that is connected to the pilot burner 15 by the conduit 16. The inlet passage 28 preferably has a reduced bore portion 33 opening into the valve chamber 27, and this reduced bore 33 provides an upwardly facing port and seat 34 for cooperation with a valve member 35 that is disposed in the chamber 27. The fitting 30 has a bored recess 36 extending longitudinally thereof that opens through its lower end and provides a downwardly directed, annular valve seat 37, spaced from and opposed to the other valve seat 34. The valve member 35 is provided with oppositely disposed seating surfaces or faces 38 and 39 for cooperation with the valve seats 34 and 37 respectively, these valve faces preferably being conical in form, as shown. The valve member 35 preferably has a stem portion 40 rigid therewith, extending upwardly and longitudinally through the fitting 30, and intermediate its ends the fitting has an internal transverse wall 41 provided with an aperture therethrough for slidably receiving the stem to guide the valve member 35. When the valve member 35 is away from its lower seat 34, as shown in Fig. 4, to permit flow from the inlet 28 to the outlet 31, the valve member seats on its upper seat 37. This prevents flow of gaseous fuel into the interior of the fitting 30 which would otherwise escape into the casing and to atmosphere and be wasted.

A rod-like plunger member 43 is provided to move the valve member 35, and has a lower end portion slidably received and guided in a bored recess 44 in the upper end of the fitting or guide member 30 above the transverse wall 41 thereof. The plunger member 43 projects externally of the casing 18 through an aperture in a closure plug 46 that closes an opening in the casing top wall 19. Preferably the plunger member 43 is provided with a chamber 47 therein that may be a bored recess extending longitudinally of the plunger member to receive the upper end of the valve stem 40 which preferably has an abutment or head 48 having a sliding fit with the wall of the chamber or bore 47. Adjacent its lower end the chamber 47 has a transverse wall 49 provided with a centrally disposed aperture therethrough to slidably receive and guide the valve stem 40. Surrounding the valve stem 40, within the chamber 47 of plunger member 43, there is a helical coil spring 50 that provides a lost motion connection between the plunger 43 and the valve member 35. The spring 50 has one end thereof abutting the lower wall 49 of the plunger member 43 and has its other or upper end abutting the underside of the valve stem head 48. Surrounding the plunger member 43 there is a helical coil spring 51 having one end abutting an external, upwardly facing shoulder of the plunger 43 and having its other or upper end abutting the closure plug 46. The spring 51 acts to move the plunger 43, and the valve 35 carried thereby, downwardly and is adapted to hold the valve tightly on its lower seat 34 to stop delivery of fuel to the control burner 15.

Projecting from the casing rear wall 24 there is preferably a tubular casing 54 that may have one end fitting and secured in a bore of an external boss 55 of the casing rear wall 24. Disposed in the casing 54, adjacent its outer end, there is a temperature responsive element 56, preferably a helical coil of bi-metal. Secured in and to the casing 54, intermediate its ends, there is a tubular member 57 to which one end of the bi-metal coil 56 may be secured or anchored, such as by rivets 58. The other end of the bi-metal coil 56 is secured to a rotatable shaft 59 that extends longitudinally through the tubular casing 54 and projects into the casing 18. Journaled on the shaft 59 in casing 18 there is a latch member 60 provided to releasably hold the plunger member 43 against downward movement by the spring 51 at temperatures of the thermostatic coil 56 below a predetermined desired temperature. The latch member 60 may be in the form of an arm that may have an aperture adjacent one end thereof to loosely receive the shaft 59, and the other or outer end of the latch member 60 may engage under a downwardly facing, external shoulder 61 of the plunger member 43. Rigidly secured to the shaft 59, between the latch 60 and the casing front wall or cover 23, there is an arm 62 that operatively connects the shaft 59 and latch 60. Rigidly secured to the latch member 60 there is an abutment member 63 in the form of a pin that extends longitudinally of the shaft 59 and is arranged to engage an adjustable abutment member 63a carried by the arm 62. The adjustable abutment member 63a may be a screw, and the abutment pin 63 may be arranged to engage the head of the screw, as shown in Fig. 3. The abutment pin 63 is held in engagement with the head of the screw 63a by a coil spring 64 that may be wound around the shaft 59 between the arm 62 and the latch member 60. The spring 64 has one end, as at 65, bearing against the pin 63 and has its other end, as at 66, bearing against the arm 62. The spring 64 is under tension urging the loosely journaled latch member 60 in a direction such that the pin 63 is held in engagement with the abutment member or screw 63a of the arm 62, and the spring 64 also acts to hold the latch member under its catch or shoulder 61. To the outer end of the arm 62 there is secured one end of a helical coil spring 67, the other end of which spring may be secured to the casing 18. The spring 67 is under tension acting to rotate arm 62 in a direction to move the latch member 60 out of engagement with the plunger 43. As shown in Fig. 1, the control device 17 is arranged with its tubular casing 54 projecting into the furnace stack 2 so that the thermostatic element 56 will be responsive to the temperature of the flue gases or products of combustion, and preferably the element 56 is located in the stack just above the top wall of the furnace 1.

The operation of the herein described heating apparatus control system is as follows: To start the system in operation the plunger member 43 is manually raised or pulled upward to the position shown in Fig. 4, in which position it is releasably held by the latch member 60. On raising the plunger 43 to a predetermined position the latch member 60, under the action of spring 64, moves into holding relation with the plunger, the upper end of the latch member positioning under the shoulder 61 of the plunger. Raising of the plunger 43 raises or lifts the valve member 35 upward away from its seat 34 thus permitting flow of fuel through the valve port. The valve member 35, plunger 43 and latch member 60 are arranged such that on opening of the valve 35, after the valve engages its upper seat 37, additional upward movement of the plunger 43 is required to permit the latch member 60 to position under the plunger shoulder 61. This additional movement compresses the spring 50, storing a force therein that urges and holds the valve member 35 tightly against its upper seat 37 so as to prevent leakage of fuel into the casing 18. Also, raising of the plunger 43 compresses and stores a downwardly directed force in the spring 51 which acts to move the plunger 43 and the valve member 35 downward. With valve port 34 open, fuel now flows to the control or pilot burner 15 and is ignited and heats the bulb element 14 of the thermostatic power element 11. When the power element bulb 14 is heated to a predetermined temperature, the power element 11 will overcome the spring 9 which will permit the spring 9a to move the valve 7 and hold it in an open position to permit flow of gas to the main burner 3, where it will be ignited by the burner 15. If the temperature of the flue gases or products of combustion passing up the stack 2 reaches a predetermined high temperature, the bi-metal coil 56 will act to rotate shaft 59 and arm 62 in a clockwise direction, as seen in Fig. 3, or will no longer oppose rotation of the shaft 59, with the result that spring 67, acting through the arm 62, will move latch member 60 out of engagement with the plunger 43. The plunger 43 will then descend by its weight, aided by the force of spring 51, and the inner or upper end wall of the plunger chamber 47 will engage the head 48 of valve stem 49 and through this positive connection move the valve member 35 downward to its seat 34 to stop delivery of fuel to the control burner 15. After the control burner 15 has been extinguished the force exerted by the thermostatic power element decreases and, when overcome by the spring 9, the main valve 7 is closed thereby stopping supply of fuel to the main burner 3. In the event that the bi-metal coil 56 ruptures or becomes disengaged from the shaft 59, or the arm 62 becomes loose on the shaft, then the spring 67 will, through rotating arm 62, move the latch member 60 to release the plunger 43 and close valve 35 which is of course a safety feature of the device.

In heating apparatuses of the type having a boiler for heating a liquid heating medium, such as water, the device 17 may be set to operate to control the heating means to decrease heat input to the water at a temperature corresponding to a low water level in the boiler. As is well known, when the water level in a boiler decreases, the temperature of the flue gases increase correspondingly. If the level of the water in the boiler of a heating apparatus employing my device 17 decreases to a predetermined low level, resultant increase in temperature of the flue gases will cause the device 17 to extinguish the main burner 3, thereby preventing further decrease in the water level due to the heating means. Thus, in systems of the above-mentioned character, my control serves as a safety low water control.

This application is a division of my copending application, Serial No. 157,584, filed August 5, 1937, for Control systems, now Patent No. 2,240,763, issued April 4, 1941.

What I claim and desire to secure by Letters Patent of the United States is:

1. In a heating apparatus, a container for liquid to be heated, a fluid fuel burner, a valve controlling the supply of fuel to said burner, thermostatic means responsive to the temperature of the combustion gases of said burner leaving the apparatus, valve means mechanically actuated by said thermostatic means, said thermostatic means being so adjusted relative to the gas temperatures affecting it that it is operable at a combustion gas temperature corresponding to a predetermined low liquid level in said container to cause said valve to move to closed position.

2. In a heating apparatus, a container for liquid to be heated, a fluid fuel burner, a valve controlling the supply of fuel to said burner, thermostatic means responsive to the temperature of the combustion gases of said burner leaving the apparatus, valve means mechanically actuated by said thermostatic means, said thermostatic means acting at a combustion gas temperature corresponding to a predetermined low liquid level in said container to release said valve, and means urging said valve means toward closed position.

3. In a heating apparatus, a container for liquid to be heated, a fluid fuel burner for heating the liquid, a thermostatically operated valve to control the delivery of fuel to said burner, a fluid fuel control burner for said valve, said control burner at temperature above a predetermined temperature holding said valve open so that fuel may flow to said first-named burner, and a valve to control delivery of fuel to said control burner, thermostatic means mechanically connected to said second-named valve and responsive to the temperature of the combustion gases leaving the apparatus, said last-named means being so adjusted as to its operating temperature that said thermostatic means acts at a predetermined temperature corresponding to a predetermined low liquid level in said container to release said second-named valve thereby to decrease the supply of fuel to said second-named burner.

4. A safety system for limiting the maximum temperature of a heat generating means comprising a heating apparatus containing a combustion chamber having a stack for the discharge of combustion products and having a fluid fuel burner, a second burner, a thermostatically operated valve to control flow of fuel to said first-named burner and responsive to the temperature of said second-named burner, said valve being held in open position so long as said second-named burner remains lighted, a control valve to control flow of fuel to said second-named burner, releasable means holding said control valve in an open position, thermostatic means operable at a predetermined high temperature to move said holding means out of holding relation with said control valve, said thermostatic means being positioned closely adjacent the outlet from said combustion chamber to the stack and responsive at all times to the temperature of the products of combustion adjacent to and leaving said combustion chamber, means operable upon movement of said holding means by said thermostatic means for moving said second-named valve to closed position to stop flow of fuel to said second-named burner so that said first-named valve will stop flow to said first-named burner promptly upon excessive increase in the temperature of and which might damage said apparatus.

5. In a heating apparatus having a combustion chamber with a stack leading directly therefrom, a container for liquid to be heated and positioned in the combustion chamber, a main fuel burner for supplying heat to said chamber thereby to heat the liquid in said container, a main valve controlling the supply of fuel to said main burner, a thermostatic means operable when heated to a predetermined temperature to permit said main valve to be in an open position and operable below said predetermined temperature to hold said main valve in a closed position, a second burner operable to heat said thermostatic means to said predetermined temperature, a control valve carried by the stack adjacent the outlet of said chamber thereinto and operable to control the flow of fuel to said second burner, thermostatic means positioned within said stack adjacent said outlet and mechanically connected to and holding said control valve in an open position, said last-named thermostatic means being operable upon high temperature of the combustion gases entering said stack corresponding to a predetermined low liquid level in said container to release said control valve, and means operable upon release of said control valve by said last-named thermostatic means to move said control valve to closed position.

6. In a heating apparatus having a combustion chamber with a stack leading directly therefrom, a container for liquid to be heated and positioned in the combustion chamber, a main fuel burner for supplying heat to said chamber thereby to heat the liquid in said container, said main burner when operating having a substantially constant rate of heat output, a main valve controlling the supply of fuel to said main burner, thermostatic means operable when heated to a predetermined temperature to permit said main valve to be in an open position and operable below said predetermined temperature to hold said main valve in a closed position, a second burner operable to heat said thermostatic means to said predetermined temperature, a control valve carried by the stack adjacent the outlet of said chamber thereinto and operable to control the flow of fuel to said second burner, releasable means holding said control valve in an open position, thermostatic means positioned within said stack adjacent said outlet and mechanically connected to said holding means, said last-named thermostatic means being operable upon high temperature of the combustion gases entering said stack corresponding to a predetermined low liquid level in said container to release said holding means, and means operable upon release of said holding means by said last-named thermostatic means to move said control valve to closed position.

EARNEST J. DILLMAN.